(12) United States Patent
Sakai

(10) Patent No.: US 10,213,839 B2
(45) Date of Patent: Feb. 26, 2019

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Kouhei Sakai, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/511,796

(22) PCT Filed: Aug. 31, 2015

(86) PCT No.: PCT/JP2015/074645
§ 371 (c)(1),
(2) Date: Mar. 16, 2017

(87) PCT Pub. No.: WO2016/043029
PCT Pub. Date: Mar. 24, 2016

(65) Prior Publication Data
US 2017/0297116 A1    Oct. 19, 2017

(30) Foreign Application Priority Data

Sep. 18, 2014 (JP) .................. 2014-189626
Oct. 28, 2014 (JP) .................. 2014-219166

(51) Int. Cl.
*B23B 27/16* (2006.01)
*B23B 27/14* (2006.01)

(52) U.S. Cl.
CPC .......... *B23B 27/145* (2013.01); *B23B 27/141* (2013.01); *B23B 2200/0447* (2013.01);
(Continued)

(58) Field of Classification Search
CPC ........ B23C 2200/081; B23C 2200/083; B23C 2200/201; B23C 2200/323;
(Continued)

(56) References Cited

U.S. PATENT DOCUMENTS 6,786,682 B1 *  9/2004  Wiman ................. B23B 27/143
                                                    407/114
8,251,618 B2 *  8/2012  Kobayashi ............ B23B 27/143
                                                    407/114
(Continued)

FOREIGN PATENT DOCUMENTS

EP        2641677 A1    9/2013
JP     61-159341 A      7/1986
(Continued)

OTHER PUBLICATIONS

International Search Report, PCT/JP2015/074645, dated Oct. 20, 2015, 2 pgs.

*Primary Examiner* — Alan Snyder
(74) *Attorney, Agent, or Firm* — Volpe and Koenig, P.C.

(57) ABSTRACT

A cutting insert of an embodiment includes a cutting edge located at an intersecting part of an upper surface and a side surface. The cutting edge includes a corner cutting edge, a major cutting edge, and a flat cutting edge. The upper surface includes a first land surface located along the corner cutting edge, a second land surface located along the major cutting edge, and a third land surface located along the flat cutting edge. A maximum value of a width of the third land surface is smaller than a maximum value of a width of each of the first land surface and the second land surface in a top view.

13 Claims, 12 Drawing Sheets

(52) U.S. Cl.
CPC ... *B23B 2200/081* (2013.01); *B23B 2200/083* (2013.01); *B23B 2200/208* (2013.01); *B23B 2200/245* (2013.01); *B23B 2200/3654* (2013.01); *B23B 2222/16* (2013.01)

(58) Field of Classification Search
CPC ........ B23B 2200/081; B23B 2200/083; B23B 2200/201; B23B 2200/321; B23B 27/145
See application file for complete search history.

(56) References Cited

U.S. PATENT DOCUMENTS

| | | | |
|---|---|---|---|
| 2004/0146365 A1* | 7/2004 | Usui | B23B 27/145 |
| | | | 407/113 |
| 2011/0070040 A1* | 3/2011 | Park | B23B 27/143 |
| | | | 407/113 |
| 2013/0236258 A1 | 9/2013 | Nada et al. | |
| 2013/0251468 A1* | 9/2013 | Lof | B23B 27/143 |
| | | | 407/114 |

FOREIGN PATENT DOCUMENTS

| | | |
|---|---|---|
| JP | 2001-157903 A | 6/2001 |
| JP | 2002-210604 A | 7/2002 |
| JP | 2012-121131 A | 6/2012 |

* cited by examiner

CUTTING INSERT, CUTTING TOOL, AND METHOD OF MANUFACTURING MACHINED PRODUCT

TECHNICAL FIELD

The present invention relates to a cutting insert, a cutting tool, and a method of manufacturing a machined product.

BACKGROUND ART

As a cutting insert (hereinafter also referred to simply as "insert") for use in a cutting process of workpieces, such as metals, there have been known inserts respectively described in Japanese Unexamined Patent Publication No. 2012-121131 (Patent Document 1) and Japanese Unexamined Patent Publication No. 2001-157903 (Patent Document 2). In the insert described in Patent Document 1, a cutting edge has a first region, a second region, and a third region. A rake angle of a rake surface in the third region serving as a flat cutting edge is larger than a rake angle of a rake surface in each of the first region and the second region.

In the insert (indexable insert) described in Patent Document 2, a cutting edge has a nose portion, a major cutting edge, and a flat cutting edge. A land is located along the cutting edge on an upper surface of the insert, and a land angle on the flat cutting edge is larger than a land angle on the nose portion.

The insert described in Patent Document 1 has no land surface for enhancing durability of the cutting edge, and the rake angle of the rake surface located inside the flat cutting edge is relatively large. Therefore, the flat cutting edge produces satisfactory cutting performance, whereas durability deterioration can occur. The insert described in Patent Document 2 has the land surface and the land angle on the flat cutting edge is larger than the land angle on the nose portion. Therefore, the durability of the flat cutting edge can deteriorate as in the case of the insert described in Patent Document 1.

The present embodiment has been accomplished in view of the above problem, and provides a cutting insert having a flat cutting edge with satisfactory cutting performance and durability.

SUMMARY OF THE INVENTION

A cutting insert according to an embodiment includes an upper surface including a corner part and a side part adjacent to the corner part, a lower surface located on a side opposite to the upper surface, a side surface located between the upper surface and the lower surface, and a cutting edge located along an intersection part of the upper surface and the side surface. The cutting edge includes a corner cutting edge located at the corner part, a major cutting edge located at the side part, and a flat cutting edge located between the corner cutting edge and the major cutting edge. The upper surface includes a land surface located along the cutting edge, and a rake surface located more inward than the land surface. The land surface includes a first land surface located along the corner cutting edge, a second land surface located along the major cutting edge, and a third land surface located along the flat cutting edge. A maximum value of a width of the third land surface is smaller than a maximum value of a width of each of the first land surface and the second land surface in a top view.

EMBODIMENTS FOR CARRYING OUT THE INVENTION

<Cutting Insert>

Figure 1:
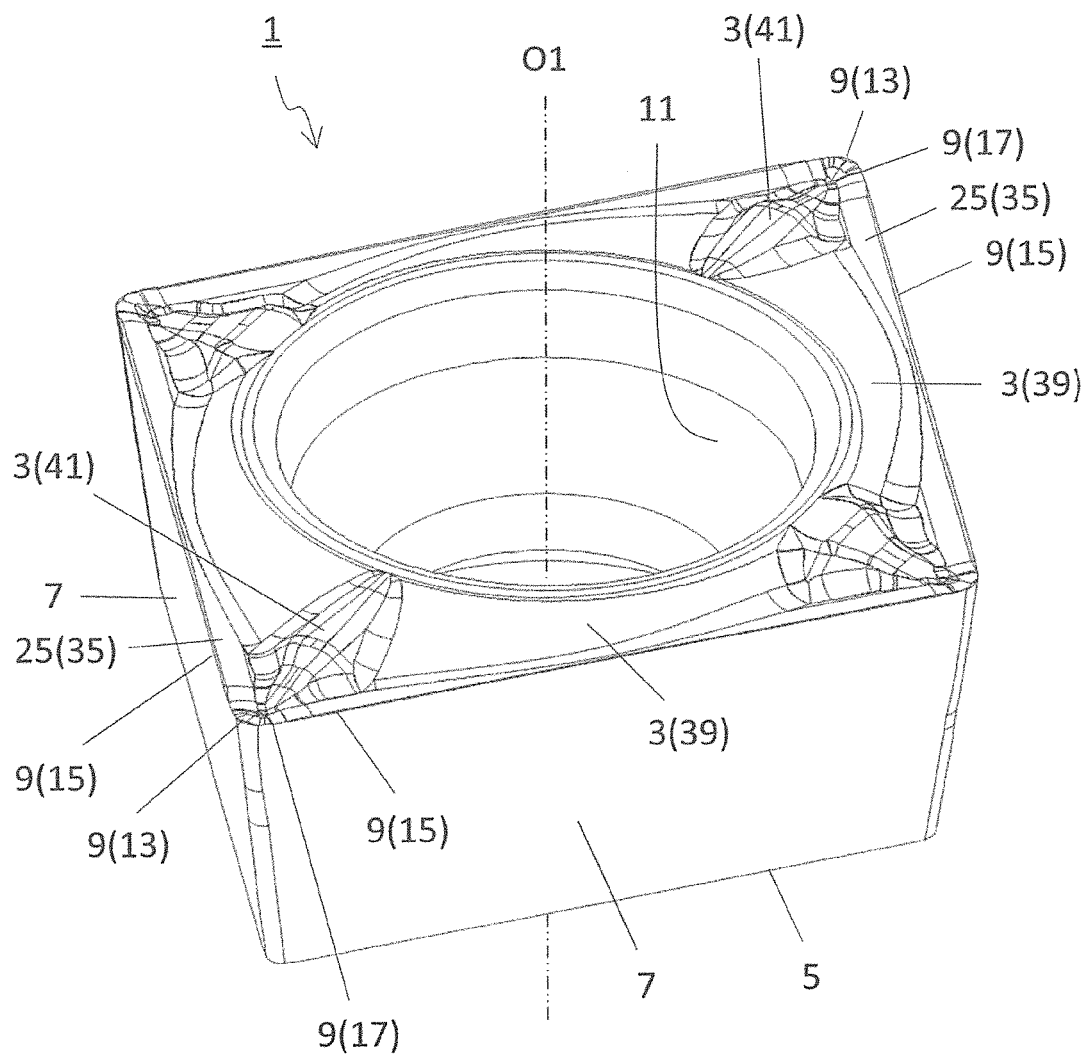
FIG. 1 is a perspective view that shows a cutting insert of an embodiment of the present invention.

A cutting insert of an embodiment is described in detail below with reference to the drawings. For the sake of convenience, the drawings referred to in the following show, in simplified form, only main components among components of the embodiment, which are necessary for describing the present invention. Therefore, the cutting insert of the present invention may include any optional component not shown in the drawings referred to. Sizes of the components in the drawings are not faithful to sizes of actual components and to size ratios of the actual components.

The cutting insert (hereinafter also referred to simply as "insert 1") of the embodiment is described with reference to FIGS. 1 to 10.

As shown in FIG. 1, the insert 1 of the present embodiment includes an upper surface 3, a lower surface 5, a side surface 7, a cutting edge 9, and a through hole 11. As a material of the insert 1, for example, cemented carbide or cermet is usable.

As a composition of the cemented carbide, there are, for example, WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of each of the above members constituting the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Figure 2:
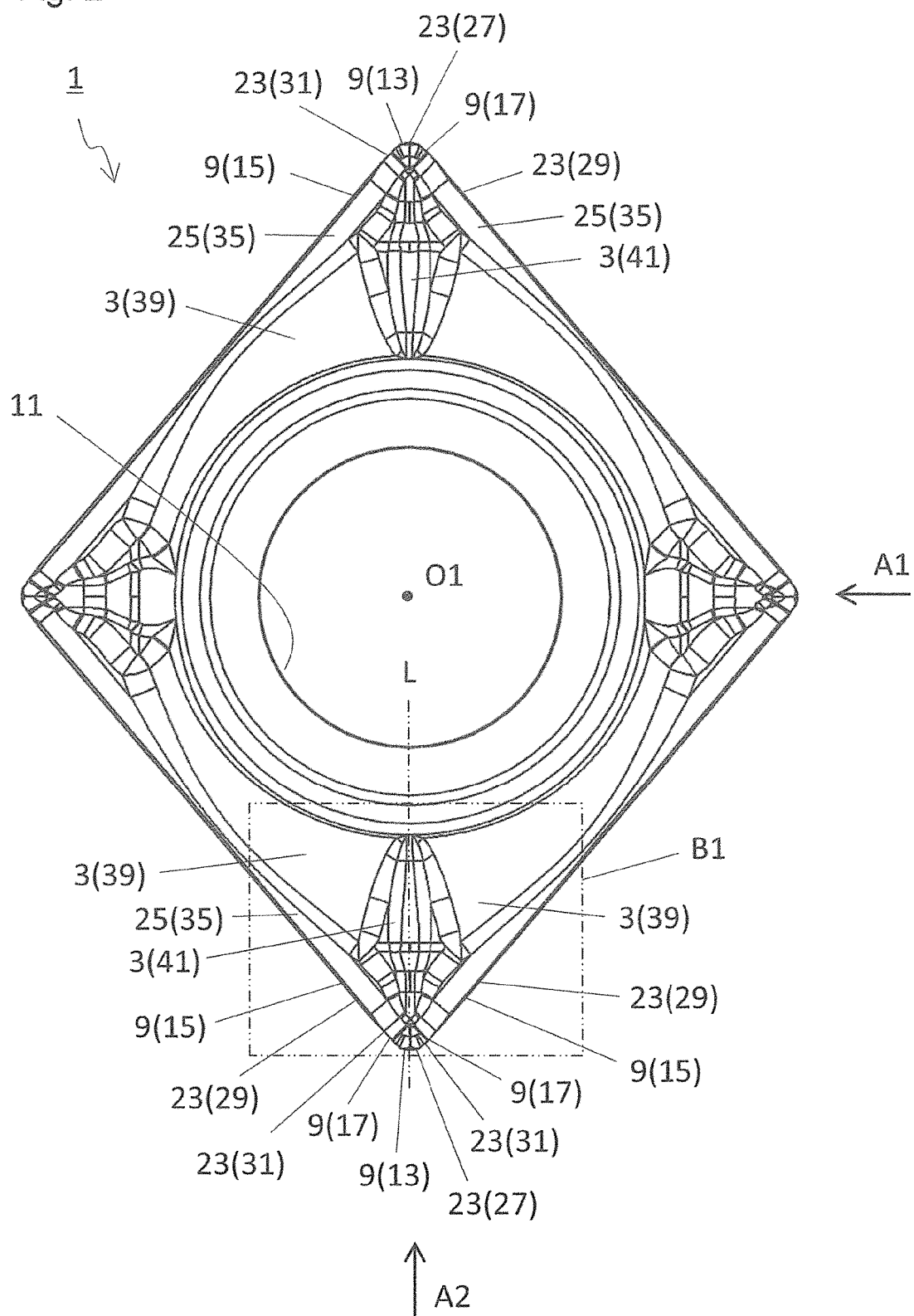
FIG. 2 is a top view of the cutting insert shown in FIG. 1.

The upper surface 3 has a polygonal shape in a top view. Therefore, the upper surface 3 includes a corner part and a side part adjacent to the corner part. As shown in FIG. 2, the upper surface 3 has a rhombus shape in the present embodiment. The rhombus-shaped upper surface 3 includes two acute angles and two obtuse angles. Hereinafter, the two acute angles are referred to as "two corner parts." A pair of side parts is adjacent to each of the two corner parts. In other words, the pair of side parts is located so as to interpose the corner part therebetween.

Here, the polygonal shape does not denote a strict polygonal shape. For example, the corner parts on the upper surface 3 in the present embodiment are not made into a strict corner, but have a circular arc shape in a top view. The pair of side parts has a straight line shape when viewed from above.

The two corner parts and the side parts adjacent to each of the corner parts have rotational symmetry around a center of the upper surface 3. Accordingly, the corner part and the pair of side parts located on a lower side in FIG. 2, and the corner part and the pair of side parts located on an upper side in FIG. are identical in shape. In the following description, the corner part and the pair of side parts located on the lower side in FIG. 2 are described, while omitting the description of the corner part and the pair of side parts located on the upper side in FIG. 2. In the present embodiment, though there are the two corner parts having the acute angle, no problem occurs even when there is only one of them.

The lower surface 5 is a surface located on the side opposite to the upper surface 3. The lower surface 5 functions as a seating surface toward an insert pocket when attaching the insert 1 to a holder. The lower surface 5 in the present embodiment has a polygonal shape corresponding to the upper surface 3. Similarly to the upper surface 3, the lower surface 5 has a rhombus shape and is, however, somewhat smaller than the upper surface 3 in the present embodiment. Alternatively, the lower surface 5 may have the same size as the upper surface 3. In this case, a circumferential edge of the lower surface 5 is overlapped with a circumferential edge of the upper surface 3 in a top view.

The shapes of the upper surface 3 and the lower surface 5 are not limited to those in the above embodiment. In the insert 1 of the present embodiment, the upper surface 3 and the lower surface 5 have an approximately square shape. Alternatively, the upper surface 3 and the lower surface 5 may have a polygonal shape, such as a triangle or pentagonal shape. Although the upper surface 3 and the lower surface 5 in the present embodiment have the rhombus shape, the square shape is not limited to the rhombus shape. For example, the upper surface 3 and the lower surface 5 may have a parallelogram shape.

A width in a longitudinal direction (a vertical direction in FIG. 2) on the rhombus-shaped upper surface 3 in the insert 1 of the present embodiment is settable to, for example, approximately 15-25 mm. A width in a direction orthogonal to the longitudinal direction (a transverse direction in FIG. 2) is settable to, for example, approximately 10-20 mm. A width in a longitudinal direction on the rhombus-shaped lower surface 5 and a width in a direction orthogonal to the longitudinal direction are settable according to the size of the upper surface 3.

A thickness of the insert 1 is settable to, for example, approximately 3-7 mm. Here, the thickness denotes a width in a height direction (a vertical direction in FIG. 3) from a portion of the upper surface 3 which is located uppermost to a portion of the lower surface 5 which is located lowermost when the insert 1 is viewed from the side.

The insert 1 of the present embodiment includes the through hole 11 extending between the center of the upper surface 3 and the center of the lower surface 5 as shown in FIG. 1. The through hole 11 is disposed for inserting a screw therethrough when screwing the insert 1 into the holder of a cutting tool. As a method for fixing the insert 1 to the holder, a clamp structure may be employed instead of the above screwing method.

A central axis O1 of the through hole 11 extends vertically because the through hole 11 is extended between the center of the upper surface 3 and the center of the lower surface 5. Therefore, a reference plane S orthogonal to the central axis O1 is set in the following. The reference plane S is used for evaluating a position of each of the components in the vertical direction and an inclination angle of a rake surface described later in the insert 1 of the present embodiment. The reference plane S is located parallel to the lower surface 5 in the present embodiment.

The center of the upper surface 3 denotes the center of gravity in the upper surface 3. When the upper surface 3 has the rhombus shape as in the present embodiment, an intersection point of diagonal lines corresponds to the center of the upper surface 3. Similarly, the center of the upper surface 5 denotes the center of gravity in the lower surface 5. When the lower surface 5 has the rhombus shape as in the present embodiment, an intersection point of diagonal lines corresponds to the center of the lower surface 5.

Figure 3:
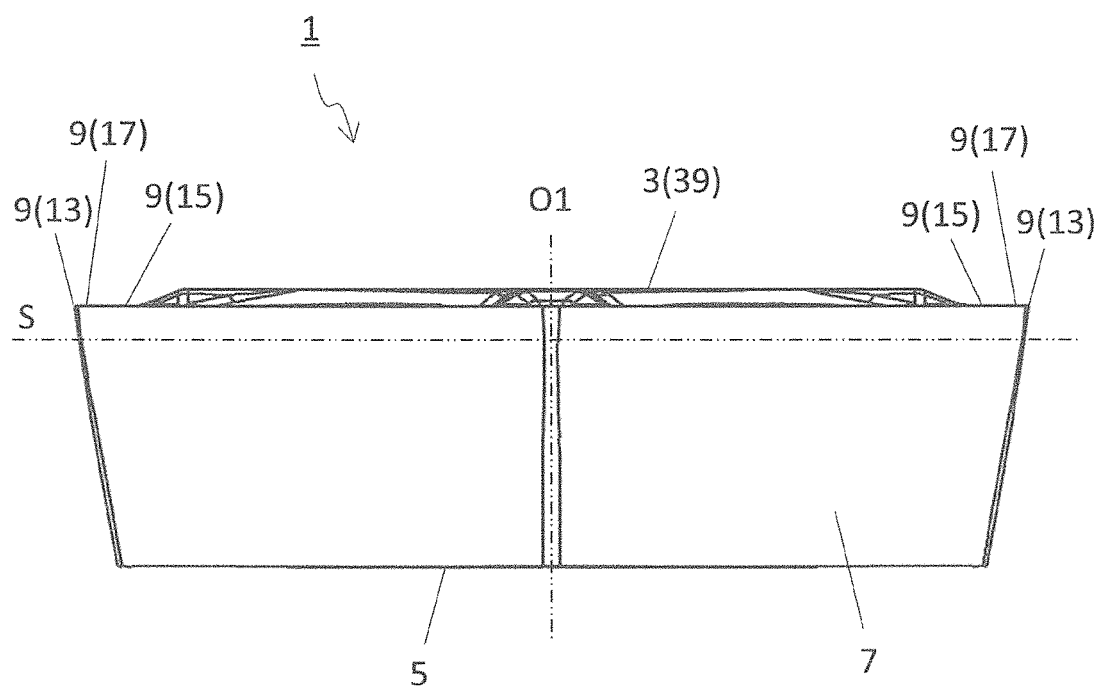
FIG. 3 is a side view of the cutting insert shown in FIG. 2 taken along A1 direction.
Figure 4:
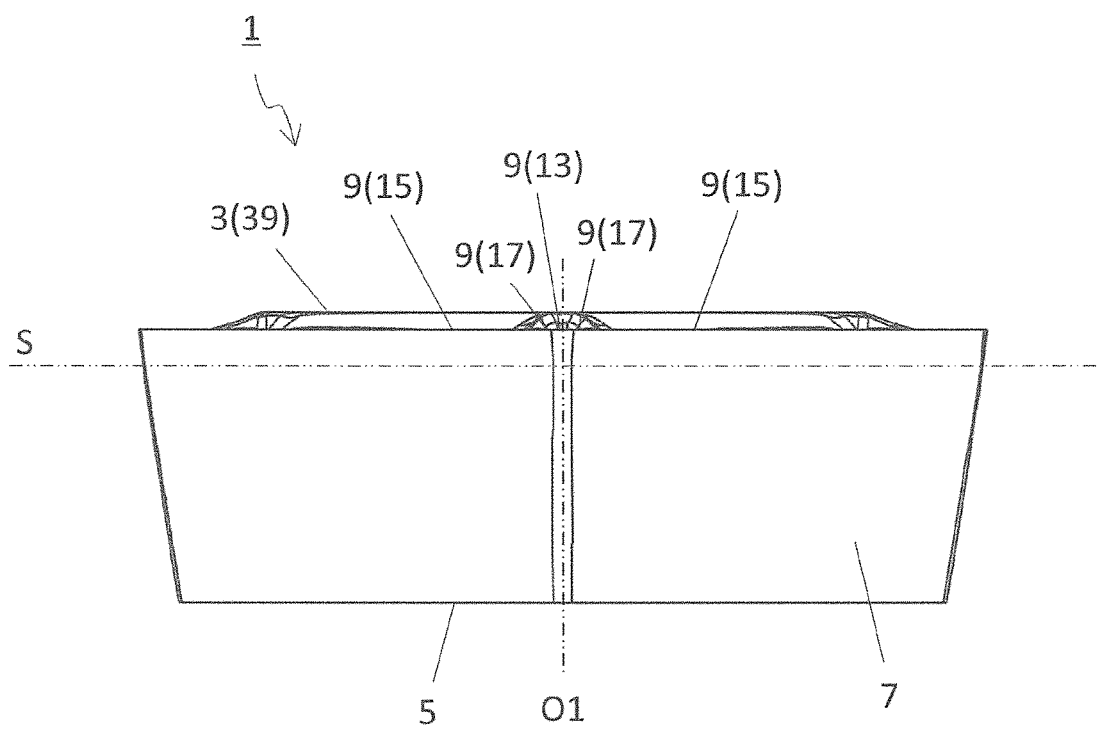
FIG. 4 is a side view of the cutting insert shown in FIG. 2 taken along A2 direction.

The side surface 7 is located between the upper surface 3 and the lower surface 5, and is connected to the upper surface 3 and the lower surface 5. The lower surface 5 is somewhat smaller than the upper surface 3 as described above. Accordingly, the side surface 7 is inclined so as to approach the central axis O1 as going from the upper surface 3 toward the lower surface 5 as shown in FIGS. 3 and 4.

Figure 5:
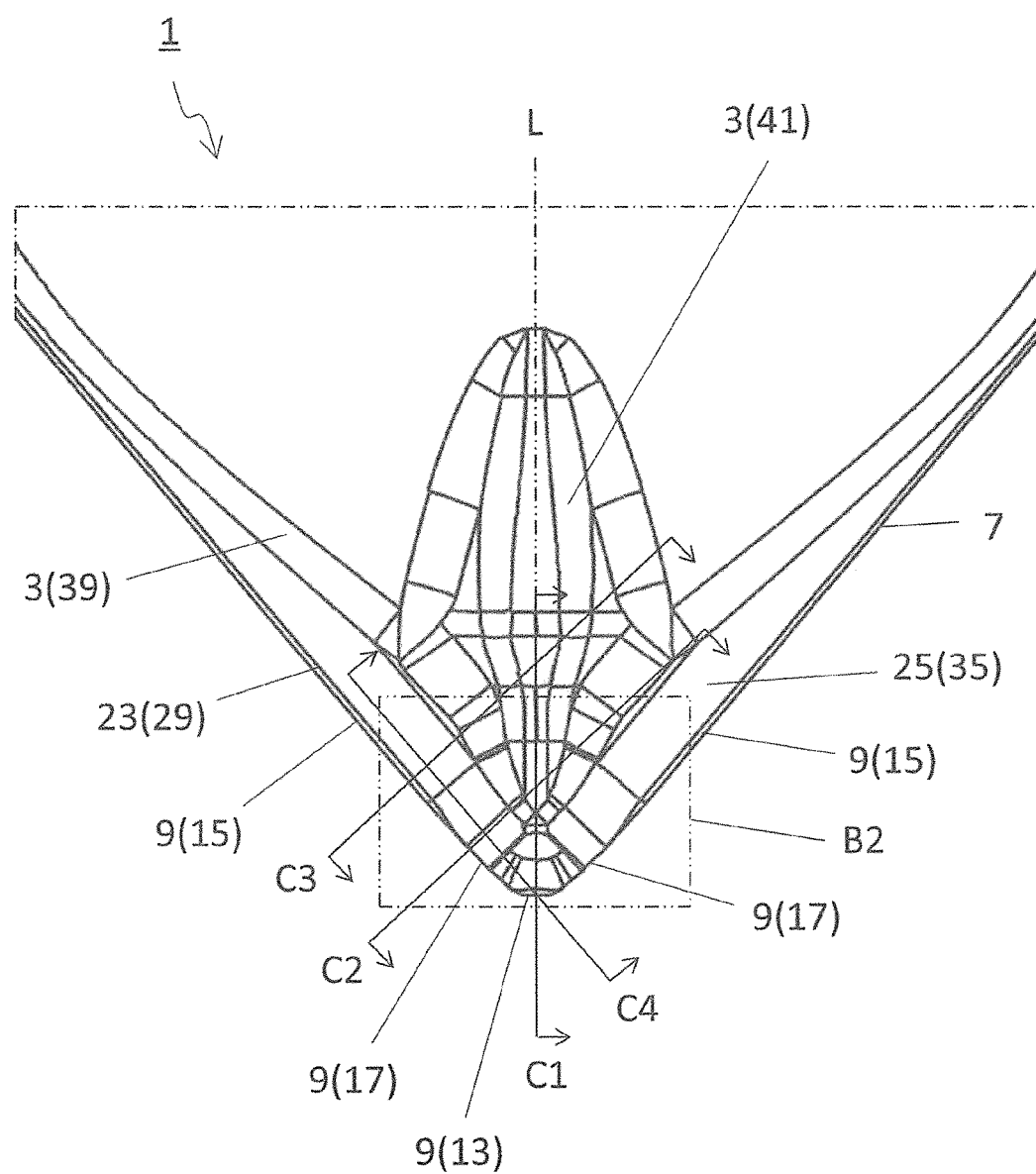
FIG. 5 is an enlarged top view of region B1 in the cutting insert shown in FIG. 2.
Figure 6:
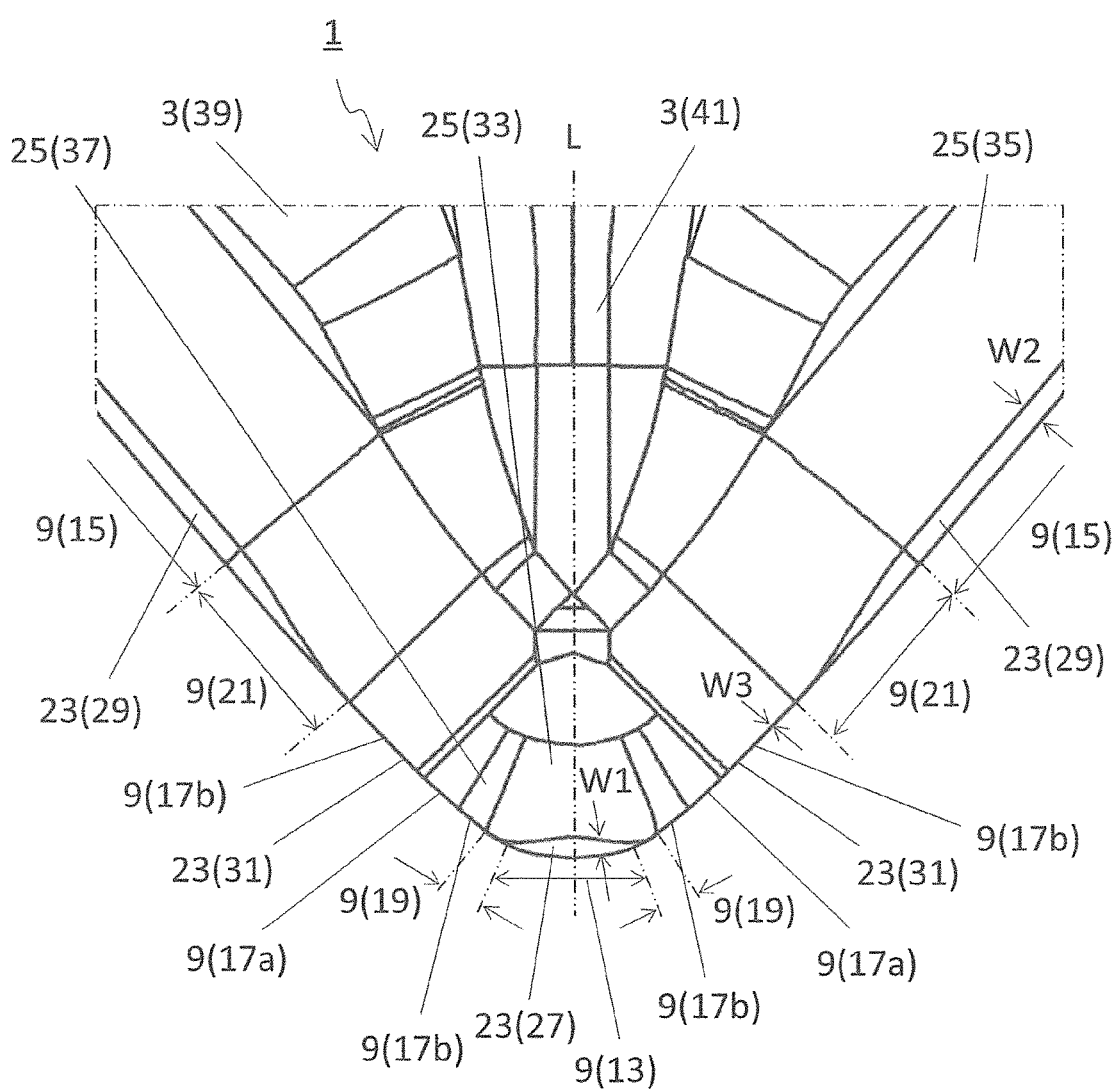
FIG. 6 is an enlarged top view of region B2 in the cutting insert shown in FIG. 5.

The cutting edge 9 is located along an intersecting part of the upper surface 3 and the side surface 7, namely, an intersecting ridge line of the upper surface 3 and the side surface 7. The cutting edge 9 in the present embodiment includes a corner cutting edge 13, a major cutting edge 15, and a flat cutting edge 17 as shown in FIGS. 5 and 6. The corner cutting edge 13 is located at the corner part on the upper surface 3. The corner part has the circular arc shape in the top view, and therefore, the corner cutting edge 13 has the circular arc shape in the top view.

A region that is located at the corner of the polygonal-shaped upper surface 3 and has a constant radius of curvature corresponds to the corner part, and a region located between the corner parts corresponds to the side part. The pair of side parts may respectively have a straight line shape in a top view, but is not particularly limited thereto.

The major cutting edge 15 is located at the side part on the upper surface 3. In the present embodiment, because the pair of side parts are located so as to interpose the corner part therebetween, the pair of major cutting edges 15 are located so as to interpose the corner cutting edge 13 therebetween. The major cutting edge 15 has a straight line shape in a top view in the present embodiment. The major cutting edge 15 denotes a part of the cutting edge which is mainly used and causes chips having a large thickness during a cutting process of a workpiece.

The flat cutting edge 17 is located between the corner cutting edge 13 and the major cutting edge 15. The flat cutting edge 17 is smoothly connected to the corner cutting edge 13 with a first connection part 19 interposed therebetween, and is also smoothly connected to the major cutting edge 15 with a second connection part 21 interposed therebetween. The flat cutting edge 17 is a component used for smoothing a processing surface of the workpiece during the cutting process. Therefore, the flat cutting edge 17 is used in such a manner as to have a smaller inclination angle with respect to the processing surface than the corner cutting edge 13 and the major cutting edge 15.

The flat cutting edge 17 in the present embodiment includes a protruding curvilinear portion 17a that is protruded outward in a top view, and a pair of straight line portions 17b located so as to interpose the protruding curvilinear portion 17a therebetween. The flat cutting edge 17 including the straight line portions 17b makes it possible to further smooth the processing surface of the workpiece. The flat cutting edge 17 including the protruding curvilinear portion 17a makes it possible to suppress a surface roughness of the processing surface of the workpiece from becoming large even when the insert 1 is displaced around the central axis O1 during the cutting process.

The flat cutting edge 17 is used for smoothing the processing surface of the workpiece and is therefore not limited to the above configuration. For example, the flat cutting edge 17 may be made up only of the protruding curvilinear portion 17a or the straight line portions.

A so-called honing process is applied to a part of an intersecting region of the upper surface 3 and the side surface 7 at which the cutting edge 9 is located. That is, a ridge line along which the upper surface 3 and the side surface 7 intersect each other is not a strict line form formed by the intersection of these two surfaces, and the region of the intersection of the upper surface 3 and the side surface 7 is made into a curved surface shape. The cutting edge 9 after being subjected to the honing process has enhanced strength. A method for making the intersecting region of the upper surface 3 and the side surface into the curved surface shape is not limited to the honing process.

The insert 1 of the present embodiment is such a so-called one-side style insert 1 that the cutting edge 9 is located only on the ridge line along with the upper surface 3 and the side surface 7 intersect each other. However, no problem occurs even when the insert 1 is such a so-called double-side style insert 1 that the cutting edge 9 is also located on a ridge line along which the lower surface 5 and the side surface 7 intersect each other, in addition to the ridge line along which the upper surface 3 and the side surface 7 intersect each other.

The upper surface 3 in the present embodiment includes a land surface 23 and a rake surface 25 as shown in FIG. 2. The land surface 23 is a small width region located along the cutting edge 9. The rake surface 25 is located more inward than the land surface 23 and located along land surface 23 in a top view. The land surface 23 has a role in enhancing the strength of the cutting edge 9. The rake surface 25 has a role in scooping up chips cut at the cutting edge 9.

An inclination angle of the land surface 23 with respect to the reference plane S is relatively small in order to enhance the strength of the cutting edge 9. An inclination angle of the rake surface 25 with respect to the reference plane S is relatively large in order to smoothly flow chips. The inclination angle of the land surface 23 with respect to the reference plane S is settable to, for example, approximately −15° to 10°. The inclination angle of the rake surface 25 with respect to the reference plane S is settable to, for example, approximately 0° to 25°. The inclination angle in the case of being inclined upward as departing from the cutting edge 9 is indicated by a minus value.

The land surface 23 includes a first land surface 27, a second land surface 29, and a third land surface 31 as shown in FIG. 6. The first land surface 27 is located along the corner cutting edge 13. The second land surface 29 is located along the major cutting edge 15. The third land surface 31 is located along the flat cutting edge 17. Thus, the third land surface 31 is located between the first land surface 27 and the second land surface 29.

A first characteristic feature in the insert 1 of the present embodiment is that a width of the land surface 23 is not constant but changes. Specifically, a maximum value of width W3 of the third land surface 31 is smaller than each of a maximum value of width W1 of the first land surface 27 and a maximum value of width W2 of the second land surface 29.

Thus, the with W3 of the third land surface 31 located along the flat cutting edge 17 is a relatively small value. This makes it possible to enhance cutting performance of the flat cutting edge 17. It is not configured so that only the inclination angle of the third land surface 31 is extremely large relative to those of the first land surface 27 and the second land surface 29. It is therefore possible to suppress the flat cutting edge 17 from having an excessively acute angle, thereby suppressing deterioration of the strength of the flat cutting edge 17. This leads to satisfactory cutting performance and durability of the flat cutting edge 17.

In FIG. 6, the width in the first land surface 27 is indicated as W1, the width in the second land surface 29 is indicated as W2, and the width in the third land surface 31 is indicated as W3. The width of the land surface 23 denotes a length from an outer periphery of the upper surface 3 to an end portion close to an inner periphery of the land surface 23 in a direction orthogonal to the outer periphery in a top view of a target region. Therefore, the land surface 23 in the present embodiment corresponds to a region including a portion subjected to the honing process in the top view. As apparent from FIG. 6, a width direction differs depending on the target region on the land surface 23.

In the present embodiment, the width W1 of the first land surface 27 reaches its maximum value on a bisector L of the corner part on the upper surface 3, and the width W1 decreases as departing from the bisector L. That is, the width W1 of the first land surface 27 decreases as being closer to the third land surface 31 in a top view. This makes it possible to make the maximum value of the width W1 larger than a maximum value of the width W3.

This also inhibits any sharp change in the width of the land surface 23 between the first land surface 27 and the third land surface 31, thereby inhibiting any sharp change in cutting force direction between the corner cutting edge 13 and the flat cutting edge 17. The maximum value of the width W1 of the first land surface 27 is settable to, for example, approximately 0.03-0.4 mm.

The width W2 of the second land surface 29 is constant, and the value of the width W2 is larger than the maximum value of the width W3. The with W2 is constant in the present embodiment. The width of the land surface 23 decreases as departing from the major cutting edge 15 and as being closer to the flat cutting edge 17. Accordingly, the value of the width W2 is larger than the maximum value of the width W3.

Variations in load applied to the major cutting edge 15 during the cutting process is inhibitable because the width W2 is constant in a region in which the major cutting edge 15 has the straight line shape. The width W2 of the second land surface 29 is settable to, for example, approximately 0.03-0.4 mm.

Chips to be cut at the major cutting edge 15 have the largest thickness as compared to those at the corner cutting edge 13 and the flat cutting edge 17. Accordingly, the major cutting edge 15 is susceptible to a larger load than the corner cutting edge 13 and the flat cutting edge 17. Hence, the maximum value of the width W2 of the second land surface 29 is preferably larger than the maximum value of each of the width W3 of the third land surface 31 and the width W1 of the first land surface 27.

Figure 7:
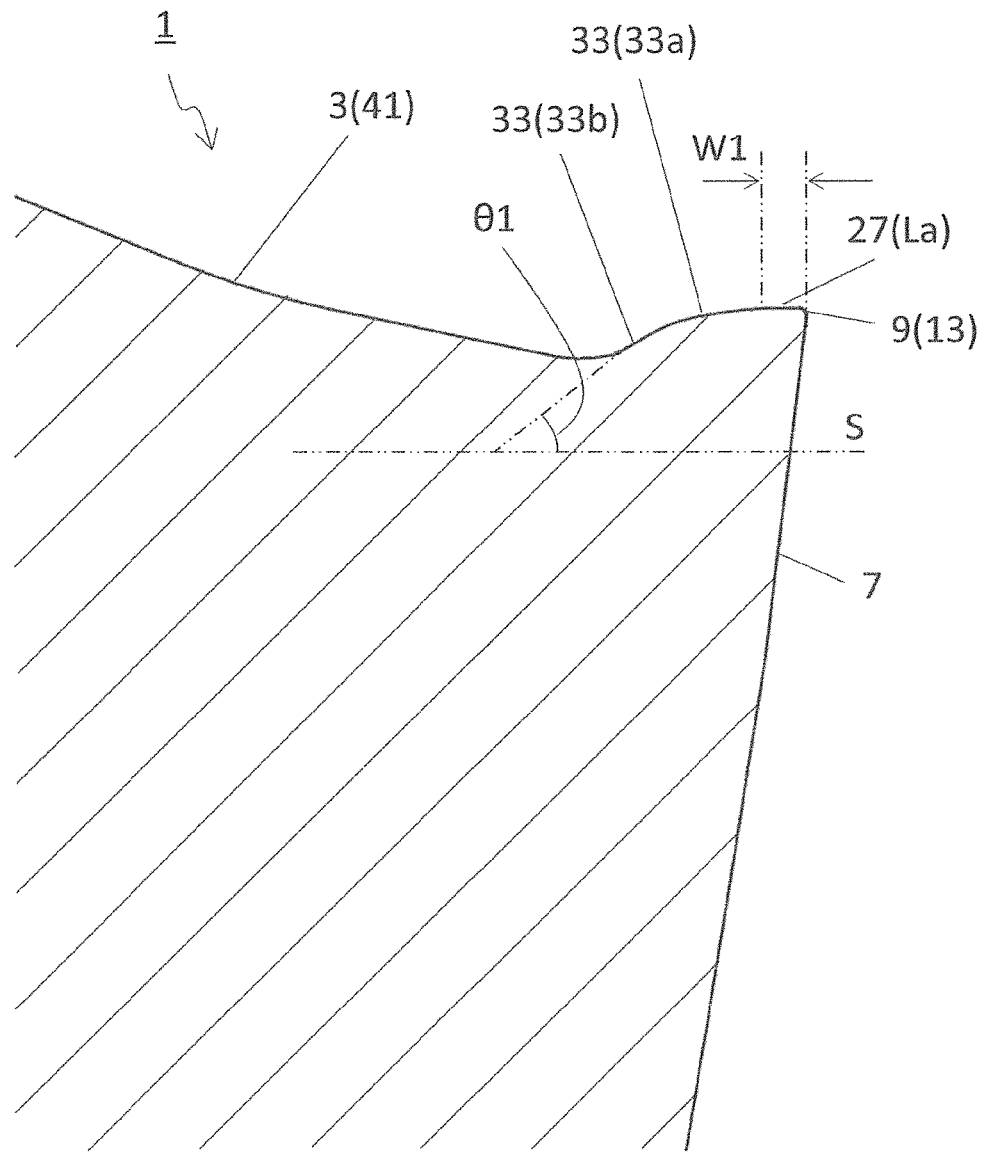
FIG. 7 is a sectional view of section plane C1 of the cutting insert shown in FIG. 5.
Figure 8:
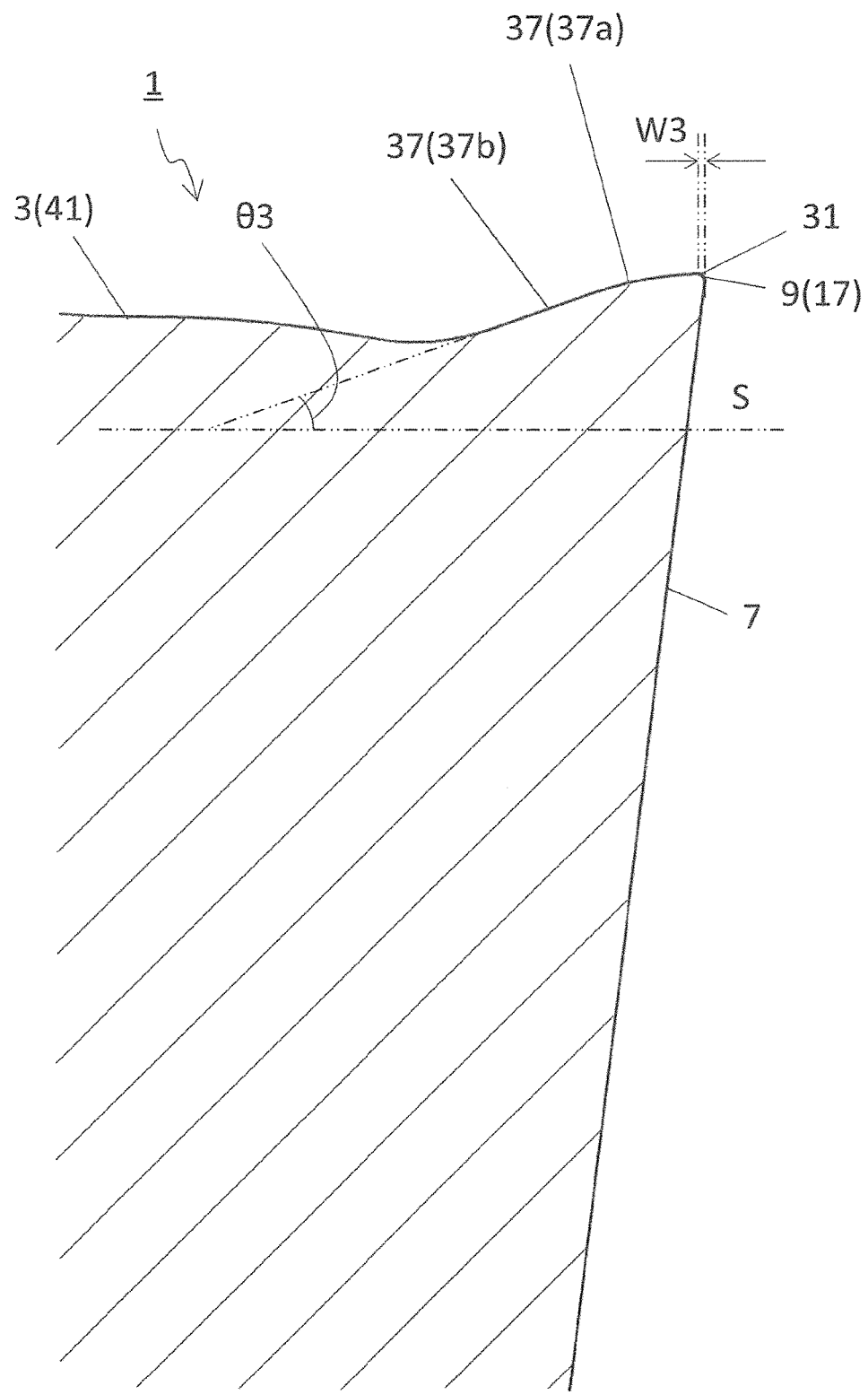
FIG. 8 is a sectional view of section plane C2 of the cutting insert shown in FIG. 5.
Figure 9:
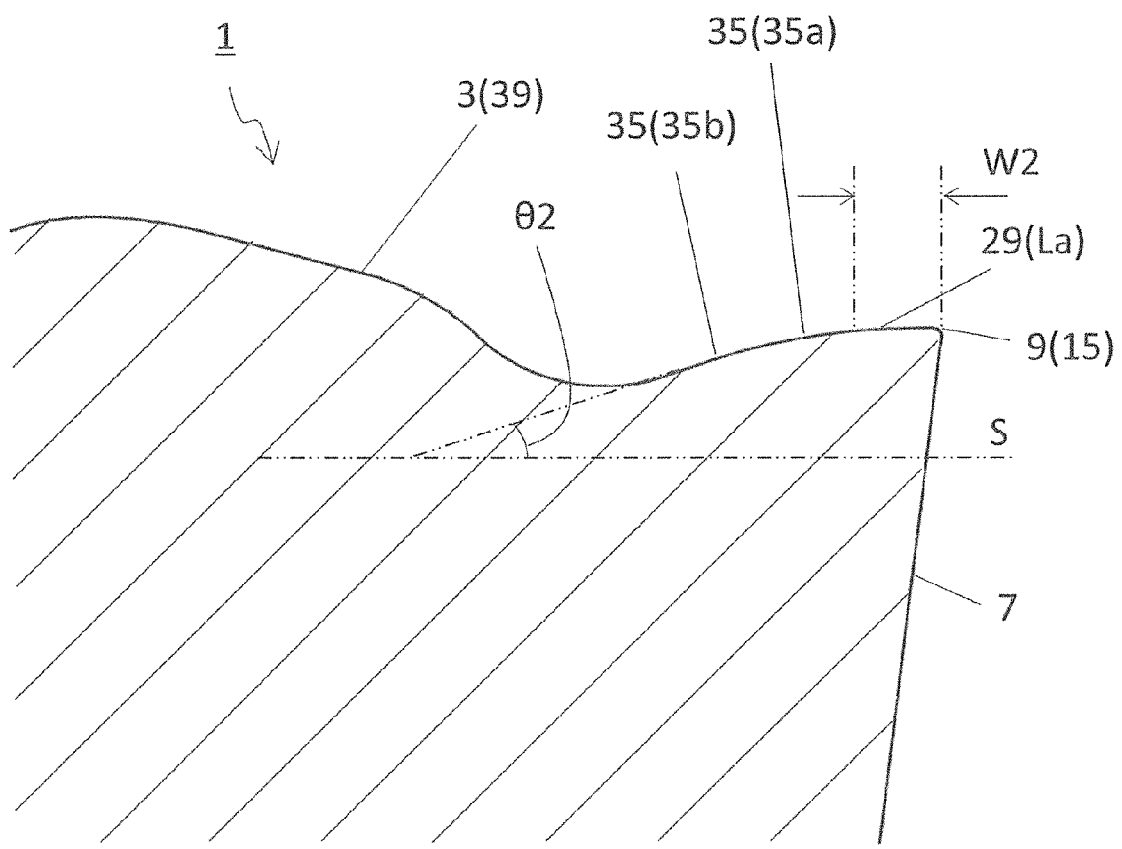
FIG. 9 is a sectional view of section plane C3 of the cutting insert shown in FIG. 5.

In the land surface 23 of the present embodiment, the first land surface 27 and the second land surface 29 include a portion having a flat surface shape La as shown in FIGS. 7 and 9. The third land surface 31 has a protruding curved surface shape as shown in FIG. 8.

To be specific, the first land surface 27 and the second land surface 29 in the present embodiment are respectively made up of the protruding curved surface-shaped portion formed by the honing process, and the portion including the flat surface shape La located inside the protruding curved surface-shaped portion. It is possible to improve durability of the corner cutting edge and the major cutting edge 15 by including the portion including the flat surface shape La.

In the present embodiment, the width of the first land surface 27 and the width of the second land surface 29 denote the width from the outer periphery of the upper surface 3 to an end portion close to an inner periphery in the portion having the flat surface shape La in the target region as shown in FIGS. 7 and 9.

The third land surface 31 in the present embodiment is made up only of the region subjected to the honing process. The third land surface 31 therefore has the protruding curved surface shape. The third land surface 31 is capable of suppressing excessive deterioration in strength by having the protruding curved surface shape, and is capable of suppressing deterioration in the cutting performance of the flat cutting edge 17 by not having the portion having the flat surface shape La. The width W3 of the third land surface 31 is settable to, for example, approximately 0-0.2 mm.

In the present embodiment, the third land surface 31 does not include the portion having the flat surface shape La, and is made up only of the region subjected to the honing process. Therefore, a portion at which a height from the lower surface 5 reaches its maximum height corresponds to a boundary between the third land surface 31 and the rake surface 25. Hence in the present embodiment, the width of the third land surface 31 denotes a width from the outer periphery of the upper surface 3 to the portion at which the height from the lower surface 5 reaches the maximum height as shown in FIG. 8.

Although the third land surface 31 in the present embodiment does not include the portion including the flat surface shape La, the third land surface 31 may include the flat surface-shaped portion as in the case of the first land surface and the second land surface 29. Further, the third land surface 31 in the present embodiment is made up only of the region subjected to the honing process, and therefore the width of the third land surface 31 can become almost zero when the honing process is not carried out.

The rake surface 25 includes a first rake surface 33, a second rake surface 35, and a third rake surface 37 as shown in FIG. 6. The first rake surface 33 is located inside the first land surface 27. The second rake surface 35 is located inside the second land surface 29. The third rake surface 37 is located inside the third land surface 31. Accordingly, the third rake surface 37 is located between the first rake surface 32 and the second rake surface 35 in a top view.

Although the inclination angle (rake angle) of each of the first rake surface 33, the second rake surface 35, and the third rake surface 37 may be configured to be constant, the insert 1 of the present embodiment has a second characteristic feature that the rake angles of these surfaces are not constant but change. Consequently, the rake surface 25 made up of the first rake surface 33, the second rake surface 35, and the third rake surface 37 is curved as a whole.

To be specific, the third rake surface 37 is more concave downward than the first rake surface 33 and the second rake surface 35. For example, as shown in FIG. 10, the third rake surface 37 is located lower as indicated by arrow S2 than a virtual straight line S1 connecting a lower end of the first rake surface 33 and a lower end of the second rake surface 35 in a cross-section including the first rake surface 33, the second rake surface 35, and the third rake surface 37.

Thus, the third rake surface 37 is concave so as to be located lower than the first rake surface 33 and the second rake surface 35. This ensures that chips flowing along the first rake surface 33, the second rake surface 35, and the third rake surface 37 are curved along the third rake surface 37. The chips are hardened by being curved, thereby facilitating breakage of the chips.

Figure 10:
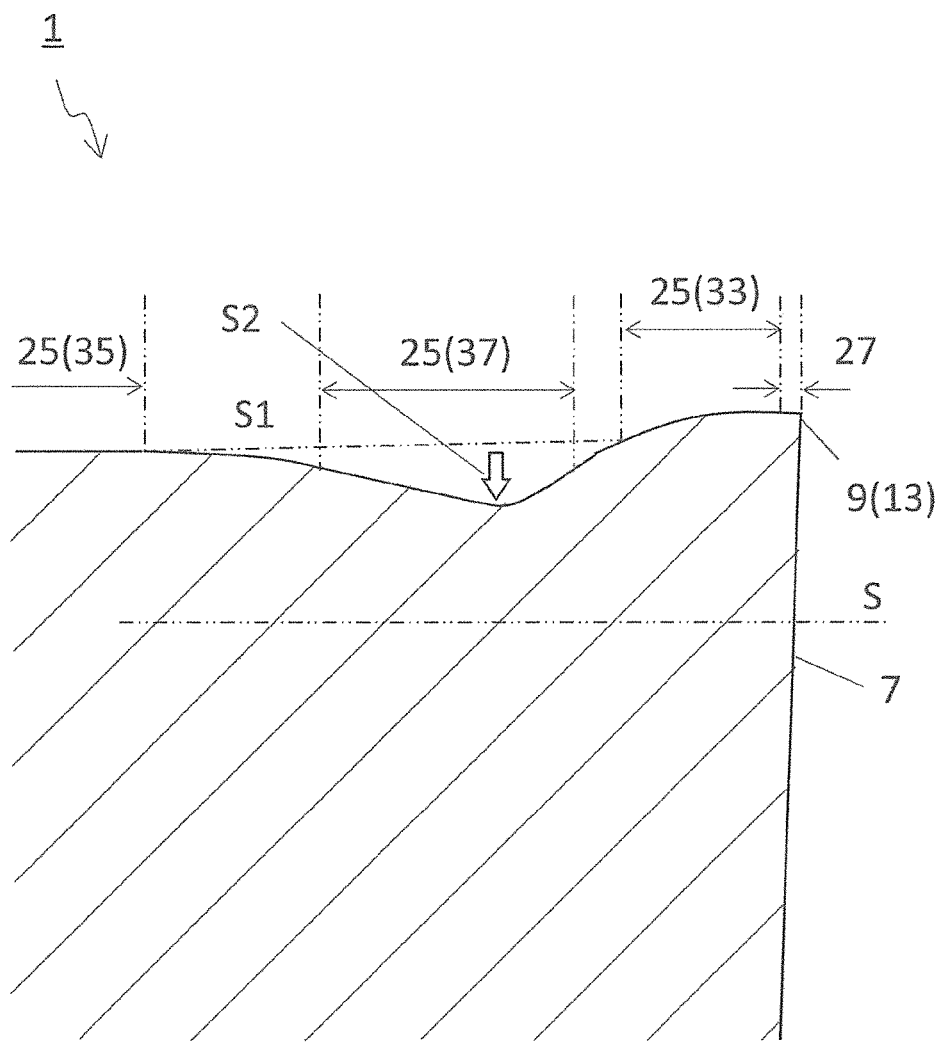
FIG. 10 is a sectional view of section plane C4 of the cutting insert shown in FIG. 5.

In order to make it easier to visually understand a vertical positional relationship among the first rake surface 33, the second rake surface 35, and the third rake surface 37, a cross-section C4 in FIG. 5 is shown in a state of being enlarged vertically in FIG. 10.

The first rake surface 33 in the present embodiment includes a first outer rake surface 33a and a first inner rake surface 33b. The first outer rake surface 33a is in the shape of a circular arc and located relatively close to the corner cutting edge 13 in a cross-section orthogonal to the corner cutting edge 13 shown in FIG. 7. The first inner rake surface 33b is in the shape of a straight line and located more away from the corner cutting edge 13 than the first outer rake surface 33a.

The chips flow smoothly from the first land surface 27 through the circular arc-shaped first outer rake surface 33a toward the first inner rake surface 33b. Because the first rake surface 33 has the circular arc-shaped first outer rake surface 33a, a rake angle of the first rake surface 33 is not constant and the rake angle reaches its maximum value at the straight line-shaped first inner rake surface 33b. A rake angle θ1 of the first inner rake surface 33b is settable to, for example, 15-35°.

The second rake surface 35 in the present embodiment includes a second outer rake surface 35a and a second inner rake surface 35b. The second outer rake surface 35a is in the shape of a circular arc and located relatively close to the major cutting edge 15 in a cross-section orthogonal to the major cutting edge 15 shown in FIG. 9. The chips flow smoothly from the second land surface 29 through the circular arc-shaped second outer rake surface 35a toward the second inner rake surface 35b.

The second inner rake surface 35b is in the shape of a straight line and located more away from the major cutting edge 15 than the second outer rake surface 35a. Because the second rake surface 35 includes the circular arc-shaped second outer rake surface 35a, a rake angle of the second rake surface 35 is not constant and the rake angle reaches its maximum value at the straight line-shaped second inner rake surface 35b. A rake angle θ2 of the second inner rake surface 35b is settable to, for example, 10-30°.

The third rake surface 37 in the present embodiment includes a third outer rake surface 37a and a third inner rake surface 37b. The third outer rake surface 37a is in the shape of a circular arc and located relatively close to the flat cutting edge 17 in a cross-section orthogonal to the flat cutting edge 17 shown in FIG. 8. The chips flow smoothly from the third land surface 31 through the circular arc-shaped third outer rake surface 37a toward the third inner rake surface 37b.

The third inner rake surface 37b is in the shape of a straight line and located more away from the flat cutting edge 17 than the third outer rake surface 37a. Because the third rake surface 37 includes the circular arc-shaped third outer rake surface 37a, a rake angle of the third rake surface 37 is not constant and the rake angle reaches its maximum value at the straight line-shaped third inner rake surface 37b. A rake angle of the third inner rake surface 37b is settable to, for example, 10-30°.

Here, as shown in FIGS. 7 to 9, the maximum value $\theta 1$ of the rake angle of the first rake surface 33 is larger than each of the maximum value $\theta 2$ of the rake angle of the second rake surface 35 and the maximum value $\theta 3$ of the rake angle of the third rake surface 37. Specifically, the rake angle $\theta 1$ of the first inner rake surface 33b is larger than each of the rake angle $\theta 2$ of the second inner rake surface 35b and the rake angle $\theta 3$ of the third inner rake surface 37b.

The rake angle $\theta 1$ of the first inner rake surface 33b, namely, the maximum value of the rake angle of the first rake surface 33 is relatively large. It is therefore possible to reduce the width of the first rake surface 33 in a top view. This ensures that a protruded part 39 is located close to the corner cutting edge 13 and the protruded part 39 stably controls a flow of chips which are generated by the corner cutting edge 13 and have a relatively small thickness. This leads to stable control of the chips.

The maximum value of the rake angle of the first rake surface 33 is relatively large, whereas the maximum value of the rake angle of the second rake surface 35 is equal to the maximum value of rake angle of the third rake surface 37 in the present embodiment. That is, the rake angle $\theta 2$ of the second inner rake surface 35b and the rake angle $\theta 3$ of the third inner rake surface 37b have the same value. This contributes to enhancing the strength of the rake surface, thereby enhancing the durability of the cutting insert 1.

Each of the major cutting edge 15 and the flat cutting edge 17 is located at the side part on the upper surface. Therefore, when there is a large gap between the value of the rake angle $\theta 2$ and the value of the rake angle $\theta 3$, a large gap can occur between the flow of chips along the second rake surface 35 and the flow of chips along the third rake surface 37. Consequently, the flow of chips as a whole is more likely hindered. However, a satisfactory flow of chips as a whole is obtainable from the fact that the rake angle $\theta 2$ and the rake angle $\theta 3$ have the same value.

Here, the phrase that the rake angle $\theta 2$ and the rake angle $\theta 3$ have the same value does not denote that both have strictly the same value. A gap of approximately 5° is allowable between the value of the rake angle $\theta 2$ and the value of the rake angle $\theta 3$.

In the insert 1 of the present embodiment, a width of the first inner rake surface 33b in the cross-section orthogonal to the corner cutting edge 13 is smaller than each of a width of the second inner rake surface 35b in the cross-section orthogonal to the major cutting edge 15 and a width of the third inner rake surface 37b in the cross-section orthogonal to the flat cutting edge 17. Accordingly, the width of the first rake surface 33 is relatively small in a top view.

Consequently, the maximum value of the width of the first rake surface 33 is smaller than the maximum value of the width of each of the second rake surface 35 and the third rake surface in the top view in the insert 1 of the present embodiment. This makes it possible for the protruded part 39 to stably control the chips.

The first outer rake surface 33a, the second outer rake surface 35a, and the third outer rake surface 37a are in the shape of the circular arc in their respective sectional views. Although these rake surfaces 25 may have the same value of radius of curvature, the radius of curvature of the first outer rake surface 33a is smaller than the radius of curvature of each of the second outer rake surface 35a and the third outer rake surface 37a.

The thickness of chips generated by each of the major cutting edge 15 and the flat cutting edge 17 is apt to be larger than the thickness of chips generated by the corner cutting edge 13. When the second outer rake surface 35a located inside the major cutting edge 15 and the third outer rake surface 37a located inside the flat cutting edge 17 are in the shape of a gently curved surface having a large radius of curvature, it is possible to ensure that chips having a large thickness flow stably along the second outer rake surface 35a and the third outer rake surface 37a.

The width of the first rake surface 33 in a top view is further reducible from the fact that the radius of curvature of the first outer rake surface 33a is relatively small. This ensures that the protruded part 39 is located closer to the corner cutting edge 13.

When the radius of curvature of the first outer rake surface 33a is relatively small, the flow of chips flowing along the first outer rake surface 33a is apt to be relatively fast, thus causing a speed difference between the flow of chips flowing along the second outer rake surface 35a and the flow of chips flowing along the third outer rake surface 37a. Upon occurrence of the speed difference, deformation of laterally curled chips is facilitated to make it easier for the chips to become stable.

Additionally, the protruded part 39 is located inside the rake surface 25 as shown in FIG. 1, or the like. The protruded part 39 is located more inward on the upper surface 3 than the first rake surface 33, the second rake surface 35, and the third rake surface 37, and is protruded upward. The state of being protruded upward denotes the state of being located so that the height from the lower surface 5 is higher than the lower end of each of the first rake surface 33, the second rake surface 35, and the third rake surface 37.

The protruded part 39 is located ahead in a direction toward the inside of the upper surface 3 from each of the corner cutting edge 13, the flat cutting edge 17, and the major cutting edge 15 in a top view. Therefore, chips generated in each of the corner cutting edge 13, the major cutting edge 15, and the flat cutting edge 17 individually flow toward the protruded part 39.

As described earlier, the maximum value W3 of the width of the third land surface 31 located between the first land surface 27 and the second land surface 29 is relatively small. It is therefore possible to make the third rake surface 37 into a downward concave shape on the basis of the first rake surface 33 and the second rake surface 35, without relatively increasing the maximum value of the rake angle of the third rake surface 37 on the rake surface 25 located inside the land surface 23.

The protruded part 39 in the present embodiment includes a front end part 41 located so as to include the bisector L of the corner part. The front end part 41 is located on the bisector L of the corner part so as to include the bisector L of the corner part. The front end part 41 is protruded toward the corner cutting edge 13. The front end part 41 has a front end surface portion inclined downward as approaching the corner part in a cross-section orthogonal to the reference plane S.

<Cutting Tool>

A cutting tool according to an embodiment of the present invention is described below with reference to the drawings.

Figure 11:
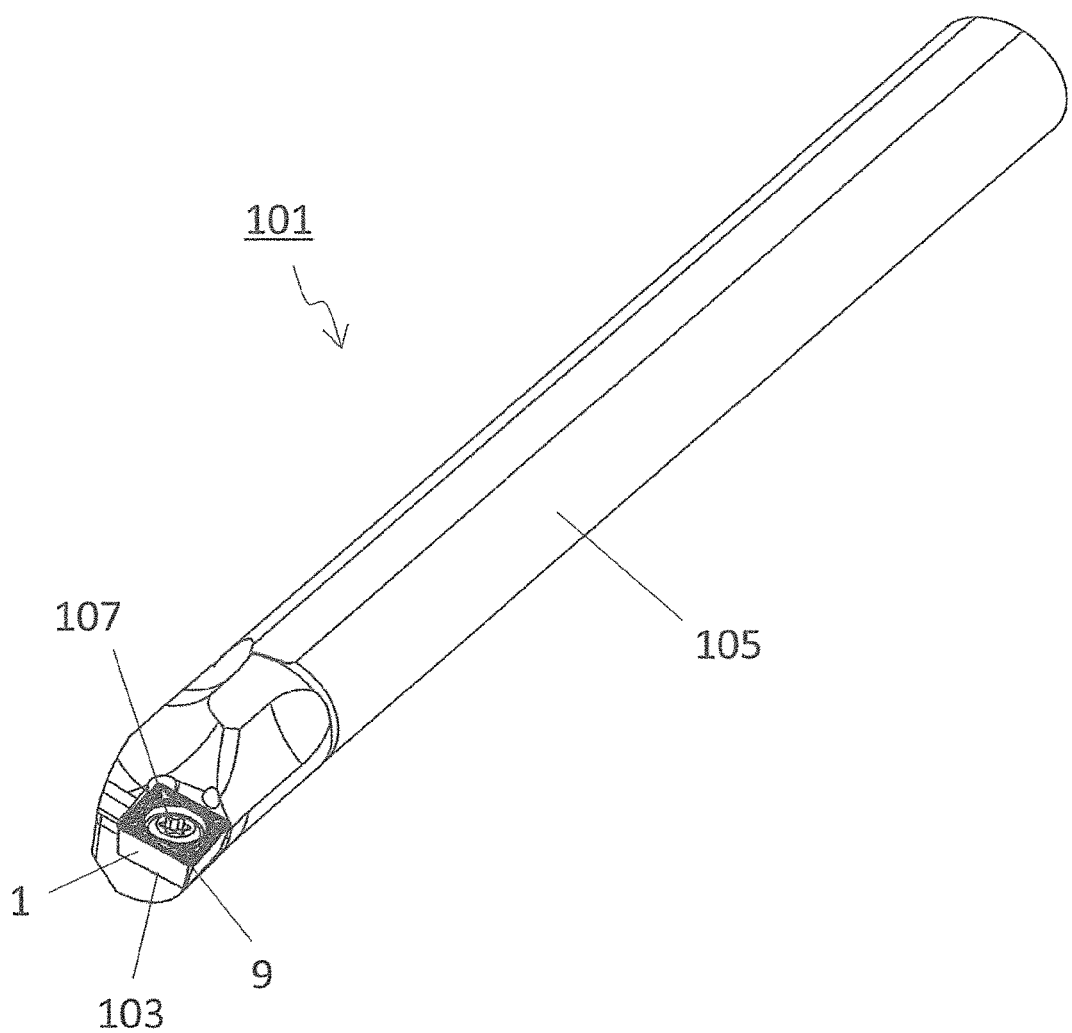
FIG. 11 is a perspective view that shows a cutting tool according to an embodiment of the present invention.

As shown in FIG. 11, the cutting tool 101 of the present embodiment includes a holder 105 that includes, on a front end side thereof, an insert pocket 103 (hereinafter referred to simply as "pocket 103"), and the cutting insert 1 attached to the pocket 103 so that the cutting edge 9 projects beyond the front end of the holder 105.

The holder 105 is in the shape of a long and narrow bar. The single pocket 103 is disposed on the front end side of the holder 105. The pocket 103 is a portion to which the insert 1 is attached and opens into a front end surface and a side surface of the holder 105. The pocket 103 also opens into the side surface 7 of the holder 105, thereby facilitating attachment of the insert 1. The pocket 103 includes a seating surface parallel to the lower surface of the insert 1, and a constraining side surface being inclined with respect to the seating surface.

The insert 1 is attached to the pocket 103. The insert 1 is attached so that at least a part of the cutting edge 9 projects beyond the front end of the holder 105. In the present embodiment, the insert 1 is attached to the holder 105 by a fixing screw 107. That is, the insert 1 is attached to the holder 105 in such a way that screw parts are screwed together by inserting the fixing screw 107 into the through hole 11 of the insert 1, and inserting the front end of the fixing screw 107 into a screw hole formed in the pocket 103.

For example, steel or cast iron is usable as the holder 105. It is particularly preferable to use steel having high rigidity among these materials.

<Method of Manufacturing Machined Product>

A method of manufacturing a machined product according to an embodiment of the present invention is described below with reference to the drawings.

The machined product is manufactured by subjecting a workpiece 201 to a cutting process. The method of manufacturing the machined product in the present embodiment includes the following steps:

(1) rotating the workpiece 201;
(2) bringing the cutting edge 9 of the cutting tool 101 represented by the foregoing embodiment into contact with the workpiece 201 being rotated; and
(3) moving the cutting tool 101 away from the workpiece 201.

Figure 12A:
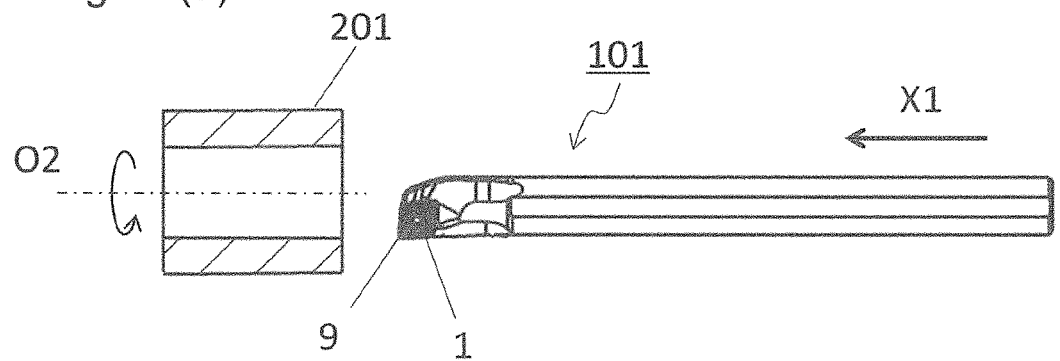
FIGS. 12(a) to 12(c) are schematic diagrams, each showing a step of a method of manufacturing a machined product according to an embodiment of the present invention.
Figure 12B:
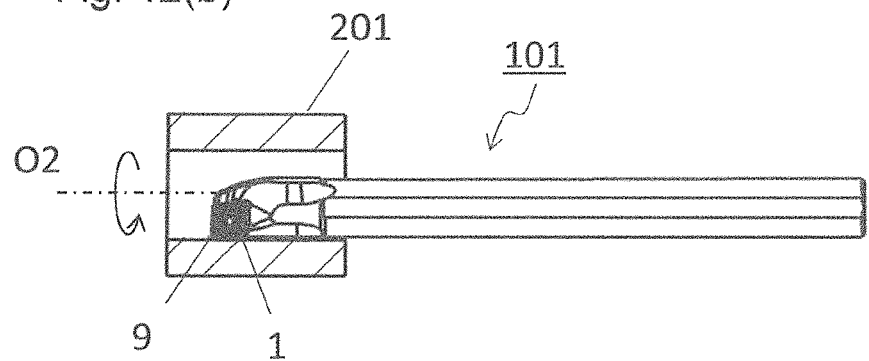
Figure 12C:
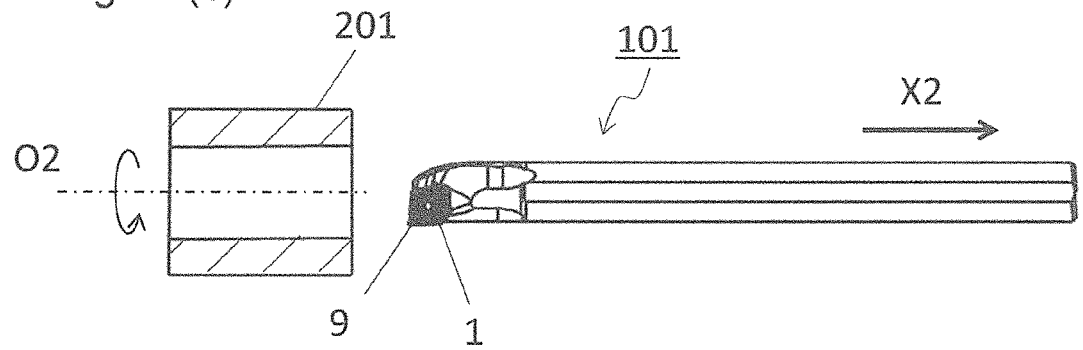

More specifically, the method includes, firstly, rotating the workpiece 201 around an axis O2, and bringing the cutting tool 101 relatively close to the workpiece 201 as shown in FIG. 12(a). Subsequently, the method includes cutting the workpiece 201 by bringing the corner cutting edge 13 of the cutting tool 101 into contact with the workpiece 201 being rotated as shown in FIG. 12(b). Then, the method includes moving the cutting tool 101 relatively away from the workpiece 201 as shown in FIG. 12(c).

In the present embodiment, the cutting tool 101 is brought close to the workpiece 201 by moving the cutting tool 101 in X1 direction in a state in which the axis θ2 is fixed and the workpiece 201 is being rotated. In FIG. 12(b), the workpiece 201 is cut by bringing the cutting edge 9 in the cutting insert into contact with the workpiece 201 being rotated. In FIG. 12(c), the cutting tool 101 is moved away by moving the cutting tool 101 in X2 direction while keeping rotation of the workpiece 201.

In the cutting process with the manufacturing method of the present embodiment, the cutting tool 101 is brought into contact with the workpiece 201, or the cutting tool 101 is moved away from the workpiece 201 by moving the cutting tool 101 in each of the steps. Of course, it is not intended to limit to the above embodiment.

For example, the workpiece 201 may be brought close to the cutting tool 101 in the step (1). Similarly, the workpiece 201 may be moved away from the cutting tool 101 in the step (3). When the cutting process is continued, it is necessary to repeat the step of bringing the cutting edge 9 in the cutting tool 10 into contact with different portions of the workpiece 201, while keeping rotation of the workpiece 201.

Representative examples of the material of the workpiece 201 include carbon steel, alloy steel, stainless steel, cast iron, and nonferrous metals.

Although the embodiment of the present invention have been described above, the present invention is not limited to the foregoing embodiment. It is of course understood that it is possible, without departing from the scope of the invention, to make modifications into any optional one.

DESCRIPTION OF THE REFERENCE NUMERAL 1 cutting insert (insert)
3 upper surface
5 lower surface
7 side surface
9 cutting edge
11 through hole
13 corner cutting edge
15 major cutting edge
17 flat cutting edge
19 first connection part
21 second connection part
23 land surface
25 rake surface
27 first land surface
29 second land surface
31 third land surface
33 first rake surface
33a first outer rake surface
33b first inner rake surface
35 second rake surface
35a second outer rake surface
35b second inner rake surface
37 third rake surface
37a third outer rake surface
37b third inner rake surface
39 protruded part
41 front end part
101 cutting tool
103 insert pocket (pocket)
105 holder
107 fixing screw
201 workpiece

The invention claimed is:

1. A cutting insert, comprising:
an upper surface comprising a corner part and a side part adjacent to the corner part;
a lower surface located on a side opposite to the upper surface;
a side surface located between the upper surface and the lower surface; and
a cutting edge located along an intersection part of the upper surface and the side surface,
wherein the cutting edge comprises a corner cutting edge located at the corner part, a major cutting edge located at the side part, and a flat cutting edge located between the corner cutting edge and the major cutting edge, wherein the upper surface comprises
a land surface located along the cutting edge, and
a rake surface located more inward than the land surface and having an inclination angle larger than the land surface,
wherein a width of the land surface is a length between the cutting edge and the rake surface in a top view,
wherein the land surface comprises a first land surface located along the corner cutting edge, a second land surface located along the major cutting edge, and a third land surface located along the flat cutting edge, and
wherein a maximum value of the width of the third land surface is smaller than a maximum value of the width of each of the first land surface and the second land surface.

2. The cutting insert according to claim 1, wherein the first land surface has a smaller width as approaching the third land surface in a top view.

3. The cutting insert according to claim 2, wherein a width of the second land surface is constant in a top view.

4. The cutting insert according to claim 1, wherein the first land surface and the second land surface have a flat surface-shaped portion, and the third land surface has a protruding curved surface shape.

5. The cutting insert according to claim 1, wherein the maximum value of the width of the second land surface is larger than the maximum value of the width of the first land surface in a top view.

6. The cutting insert according to claim 1,
wherein the rake surface comprises a first rake surface located inside the first land surface, a second rake surface located inside the second land surface, and a third rake surface located inside the third land surface, and
wherein a maximum value of a rake angle of the first rake surface is larger than a maximum value of a rake angle of each of the second rake surface and the third rake surface.

7. The cutting insert according to claim 6, wherein the maximum value of the rake angle of the second rake surface is equal to the maximum value of the rake angle of the third rake surface.

8. The cutting insert according to claim 6, wherein the third rake surface is more concave downward than the first rake surface and the second rake surface.

9. The cutting insert according to claim 6,
wherein the first rake surface comprises a circular arc-shaped first outer rake surface and a straight line-shaped first inner rake surface located more away from the corner cutting edge than the first outer rake surface in a cross-section orthogonal to the corner cutting edge,
wherein the second rake surface comprises a circular arc-shaped second outer rake surface and a straight line-shaped second inner rake surface located more away from the major cutting edge than the second outer rake surface in a cross-section orthogonal to the major cutting edge,
wherein the third rake surface comprises a circular arc-shaped third outer rake surface and a straight line-shaped third inner rake surface located more away from the flat cutting edge than the third outer rake surface in a cross-section orthogonal to the flat cutting edge, and
wherein a radius of curvature of the first outer rake surface is smaller than a radius of curvature of each of the second outer rake surface and the third outer rake surface.

10. The cutting insert according to claim 9, wherein a rake angle of the first inner rake surface is larger than a rake angle of each of the second inner rake surface and the third inner rake surface.

11. The cutting insert according to claim 9, wherein a width of the first inner rake surface in the cross-section orthogonal to the corner cutting edge is smaller than a width of the second inner rake surface in the cross-section orthogonal to the major cutting edge, and larger than a width of the third inner rake surface in the cross-section orthogonal to the flat cutting edge.

12. A cutting tool, comprising:
a holder comprising an insert pocket on a front end side of the holder; and
a cutting insert according to claim 1, the cutting insert being attached to the insert pocket so that at least a part of the cutting edge projects beyond the front end of the holder.

13. A method of manufacturing a machined product, comprising:
rotating a workpiece;
bringing the cutting edge of the cutting tool according to claim 12 into contact with the workpiece being rotated; and
moving the cutting tool away from the workpiece.

* * * * *